Feb. 8, 1955
W. EICHER ET AL
2,701,645
FILTER PRESS COCK
Filed May 19, 1950
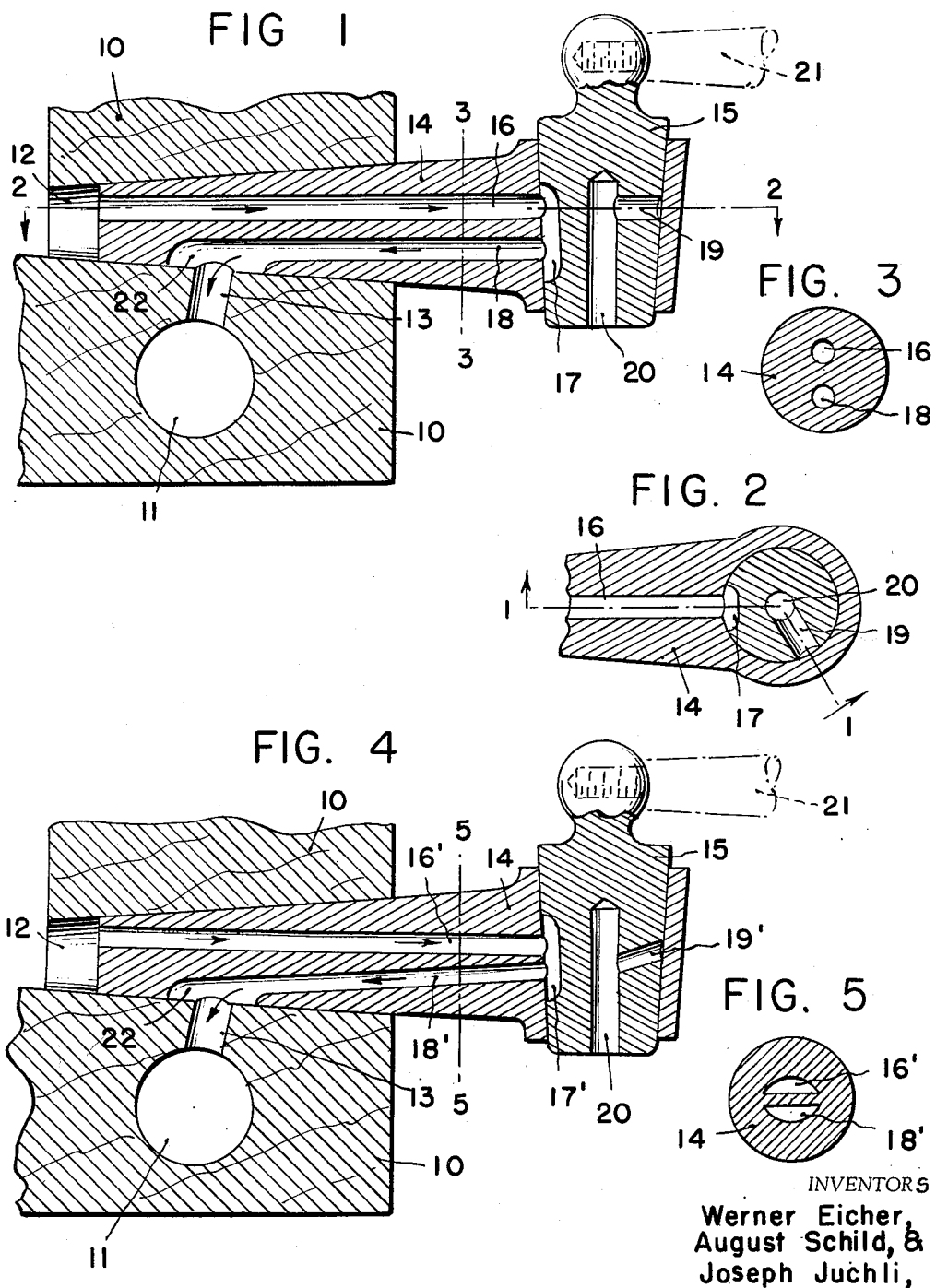
INVENTORS
Werner Eicher,
August Schild, &
Joseph Juchli,
BY Wenderoth, Lind & Ponack
ATTORNEYS United States Patent Office 2,701,645
Patented Feb. 8, 1955

2,701,645

FILTER PRESS COCK

Werner Eicher, Munchenstein, August Schild, Riehen, and Joseph Juchli, Basel, Switzerland, assignors to Ciba Limited, Basel, Switzerland, a Swiss firm Application May 19, 1950, Serial No. 162,838

Claims priority, application Switzerland June 3, 1949

4 Claims. (Cl. 210—195)

This invention relates to improvements in filter press cocks.

In the operation of filter presses it is known to be important to be able at any time, as required, to test the filtrate discharged from the individual filter press plates and, if necessary when a filter cloth begins to leak, to be able to shut down an individual filter element. This is a relatively simple matter in the case of the so-called open delivery presses, where the filtrate from each individual filter press plate flows into an open channel. However, in the case of closed delivery filter presses where the filtrate is discharged into a closed channel, for example passing through the interior of the filter press, control in this manner meets with difficulties. Constructions are indeed already known in which the filtrate from each plate is conducted through a channel to a shut-off device attached thereto, and can then if desired be passed back through a second channel into the filter press plate. The fluid-tight fitting of the two liquid channels is effected in this case by flanges or screw threads. This construction is especially suited for filter press plates of metal but is not so suitable when they are made of wood since, on account of the shrinkage and swelling which take place in the wood, a satisfactory fluid-tight fitting is not possible. On the other hand, it would be of considerable importance to be able to achieve the stated advantages also in the case of the application of filter press plates of wood or similar material, for the reason that wood on account of its relatively good stability to acid and also its other advantages (low price and light weight), in many cases constitutes an ideal material for filter press plates.

The present invention relates, as aforesaid, to a filter press cock, a primary object thereof being the embodiment of an arrangement of closed delivery filter presses which enables the taking of a test portion from an individual filter press plate at any time and, if necessary, the shutting down of a filter press plate.

According to the invention, briefly stated, a cock for the control of the discharge of filtrate from an individual filter press element has a spigot fitting a filter press plate, said spigot having an outflow channel and a return channel, of which the initial intake port and final discharge port are isolated from one another when the cock is in place, and said cock having a shut-off device adapted for operation at will to place the said channels in communication or to draw off filtrate from the outflow channel through a vent or to interrupt the flow of the filtrate.

Such a cock, according to presently-preferred embodiments, comprises a spigot having a straight-through outflow channel and a lateral-discharge return channel, and a plug having a recess in its conical wall for placing the said channels in communication in one position of said plug, and having a vent for drawing off filtrate from the outflow channel in a second position of said plug, said plug being adapted, in a third position thereof, to interrupt the flow of the filtrate.

It may be of advantage to make the lateral-discharge port larger than the corresponding port in the press into which it delivers.

The present invention also comprises an assembly of a cock as above described in a filter-press in which the outflow is from the plate chamber and the return is to a closed delivery discharge channel.

The aforesaid presently-preferred embodiments of the invention are illustrated in the accompanying drawing in which:

Fig. 1 is a vertical section, along the line 1—1 of Fig. 2, through a part of a filter plate with the cock in place;
Fig. 2 is a horizontal section along line 2—2 of Fig. 1;
Fig. 3 is a section taken along line 3—3 of Fig. 1;
Fig. 4 is a section similar to that of Fig. 1, taken through a modified form of construction; and
Fig. 5 is a section taken along line 5—5 of Fig. 4.

In the drawings, reference numeral 10 indicates the filter press plate, provided with a closed delivery discharge channel 11, and a conical passage or spigot hole 12 leading from the interior of the filter press plate to the outside. A communicating channel 13, which if required may be very short, extends between the spigot hole 12 and the closed delivery discharge channel 11. The conical body portion or spigot of the cock is shown at 14 and the shut-off device or plug at 15.

The method of operation of this device is evident from the drawing. In the normal position of working illustrated in the drawing the filtrate flows in the direction of the arrow through the upper cylindrical channel or bore 16 to the recess 17 provided in the conical wall of the plug 15 and is then turned back into the lower cylindrical channel or bore 18, being then passed into the filter press plate 10 in the closed delivery discharge channel 11. By turning the plug 15 at any time either a test portion of the filtrate may be drawn off through cylindrical bores 19 and 20 therein or alternatively the filter press plate may be shut down altogether.

The cock according to the invention is suitably made of metal, preferably one that is unaffected by the chemicals coming into contact with it, e. g. rustproof steel or bronze, or another hard material which, if desired, is resistant to acid and may obviously be provided with known devices not illustrated in the drawing, which are desirable for a good fluid-tight joint between the body of the cock and the plug and also with a stop to facilitate operation.

Moreover, it is possible, as shown more particularly in Fig. 4, to arrange the spigot bores (shown at 16' and 18') at an angle with respect to each other rather than in the essentially parallel arrangement according to the precedingly-described embodiment. The downward slope of the respective bores facilitates flow of filtrate therethrough. The bore 19' in plug 15 may also be inclined as shown. In this embodiment, the bores may be semi-circular in cross-section, as indicated in Fig. 5 providing the largest possible passage for the liquid, although they may also be of circular section, if desired.

The bores in the spigot of the filter may be made by drilling, molding or casting. The port 22 in the spigot corresponding to the communicating channel 13 is suitably somewhat larger in size than the port in the communicating channel 13 itself.

It is surprising that the problems in regard to packing and fitting are solved in a very simple manner by an arrangement of the above-described type and it could also not be foreseen that in spite of the shrinking and swelling processes in wood, a convenient operation would be possible with a cock according to the present invention. The cock according to the invention can also if desired be applied in the case of filter press plates which consist wholly or partly of a material other than wood, provided that at least that portion of the filter press plates which contains the spigot hole consists of a material which has similar fluid-tight properties to wood.

Having thus disclosed the invention, what is claimed is:

1. In combination a filter press plate of a material subject to swelling when exposed to a filtrate for a filter press of a closed delivery system and a cock for the control of the discharge of filtrate from said filter press plate, the filter press plate being provided with a transverse bore for the closed delivery of the filtrate, an interior hollow for collecting the filtrate, a substantially co-planar conical bore extending from the outside into the filter press plate, said cock having a spigot to fit said conical bore, said spigot being provided with an outflow channel and a return channel, of which the initial intake port and final discharge port are isolated from one another when the cock is in place in said bore in the filter press plate, and a cock having a shut-off device selectively operable to place the said channels in communication, to draw off filtrate from the outflow channel through a vent, and to interrupt the flow of the filtrate, said intake port and final discharge port of the spigot being in connection with the said interior hollow and with said transverse bore of the filter press plate respectively, when the spigot is in place.

2. A press plate and cock as claimed in claim 1, in which the final discharge port is a lateral-discharge port, discharging into a corresponding port in the press, and is larger than the said corresponding port.

3. An assembly of a press plate and a cock as claimed in claim 1, in which the outflow is from the interior of said plate and the return is to a closed delivery discharge channel in the plate.

4. In a filter press of a closed delivery system provided with a cock to control the discharge of filtrate from a filter press plate, that improvement comprising a cock having a spigot fitting a conical bore in the side of said press plate, said spigot of said cock being provided with an outflow channel, initial intake port, a return channel and final discharge port, said initial intake port and final discharge both being isolated from one another when the cock is in place in said bore in said press plate, said cock further provided with shut-off means selectively operable to place said outflow and return channels in communication with each other, said filter press plate provided with a bore within which the major portion of the spigot is retained and with a communicating channel engaging the outflow port of said spigot to permit said cock to draw off filtrate from said outflow channel and to selectively interrupt the flow of filtrate, said intake port and final discharge port of said spigot being in communication with said interior hollow and said communicating channel of said press plate respectively when said spigot is in place.

References Cited in the file of this patent

UNITED STATES PATENTS

| | | |
|---|---|---|
| 450,133 | Bowden | Apr. 14, 1891 |
| 664,131 | De Lancey et al. | Dec. 18, 1900 |
| 1,342,839 | Atkins | June 8, 1920 |
| 1,973,754 | Geyer | Sept. 18, 1934 |

FOREIGN PATENTS

| | | |
|---|---|---|
| 697,314 | France | Jan. 15, 1931 |